United States Patent

[11] 3,580,612

| [72] | Inventor | Arthur W. Pearson<br>506 Ramblewood, Edmond, Okla. 73034 |
|---|---|---|
| [21] | Appl. No. | 813,139 |
| [22] | Filed | Apr. 3, 1969 |
| [45] | Patented | May 25, 1971 |

[54] TRAILER HITCH
1 Claim, 6 Drawing Figs.

[52] U.S. Cl..................................................... 280/492,
280/432
[51] Int. Cl..................................................... B60d 1/16
[50] Field of Search........................................ 280/492,
447

[56] References Cited
UNITED STATES PATENTS

| 2,404,362 | 7/1946 | Carlson | 280/492 |
| 2,551,136 | 5/1951 | Keltner | 280/492 |
| 2,721,087 | 10/1955 | Pearson | 280/447 |

*Primary Examiner*—Leo Friaglia
*Attorney*—Robert K. Rhea

ABSTRACT: A pair of pivotally interconnected horizontal plates are pivotally connected, respectively, with a towing vehicle and a towed vehicle for movement about a horizontal axes.

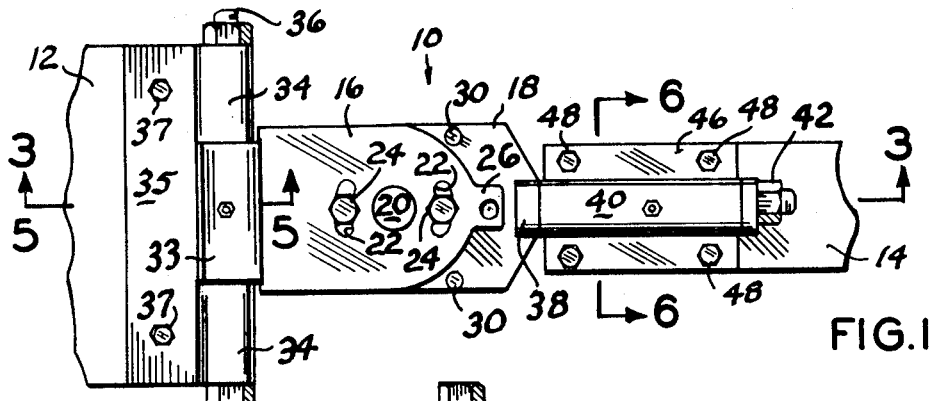

3,580,612

TRAILER HITCH

BACKGROUND OF THE INVENTION

1. Field of the Invention

The present invention relates to towing hitches for trailers, and the like.

This invention provides a flexible connection between a towing vehicle and a trailer, or the like, which eliminates to a great extent any tendency of the towed vehicle to weave during forward motion and permits locking the hitch so that the trailer may be backed in a straight path and eliminates any sagging relation between the front end of a two-wheel trailer and the supporting vehicle and further, it eliminates any tendency of the towed vehicle to jackknife with respect to the towing vehicle.

2. Description of the Prior Art

This invention is an improvement over U.S. Pat. No. 2,721,087, issued to me on Oct. 18, 1955, by providing a pivotal connection between the forward and rearward ends of its pivotally connected plates which are respectively connected with the towing and towed vehicle.

SUMMARY OF THE INVENTION

A pair of plates are pivotally joined for limited horizontal movement about a vertical axis. The uppermost plate is connected at its forward end to a horizontal shaft for vertical pivoting movement of the plates about the axis of the horizontal shaft transverse to the direction of travel of a towing vehicle. The rearward end of the lowermost plate is connected with a horizontal shaft journaled for rotative movement by a sleeve parallel to the direction of travel and connected with a towed vehicle.

The principal object is to provide a trailer hitch permitting pivotal movement about three axes, each perpendicular with respect to the axes of the other two.

BRIEF DESCRIPTION OF THE DRAWINGS

FIG. 1 is a top plan view of the device connected with fragmentary end portions of towing and towed vehicles, respectively;

FIG. 2 is a bottom view of FIG. 1;

FIG. 3 is a vertical cross-sectional view taken substantially along the line 3-3 of FIG. 1;

FIG. 4 is a top view of the device illustrating, by solid and dotted lines, the horizontal pivoting features of the device; and, FIGS. 5 and 6 are vertical cross-sectional views taken substantially along the lines 5-5 and 6-6 of FIG. 1, respectively, illustrating vertical pivoting action of the components.

DESCRIPTION OF THE PREFERRED EMBODIMENT

Like characters of reference designate like parts in those figures of the drawings in which they occur.

In the drawings:

The reference numeral 10 indicates the device, as a whole, which is substantially platelike in general configuration extending between and rigidly connected at its respective ends with the trailer hitch plate 12 of a towing vehicle and the forward end portion of the trailer tongue 14 of a towed vehicle. The device 10 comprises a pair of upper and lower plates, indicated at 16 and 18, respectively, which are centrally interconnected in face to face relation by a pin 20, or the like, for horizontal pivoting movement of the upper plate with respect to the bottom plate 18. The upper plate 18 is provided with a pair of arcuate slots 22 concentric with the pin 20 which respectively receive a pair of bolts 24 extending therethrough and through the bottom plate 18. The purpose of the slots 22 and bolts 24 is to limit rotation of the upper plate 16 about the axis of the pin 20. The rearward end portion of the upper plate 16 is arcuately curved concentric with respect to the axis of the pin 20 and is provided with a rearwardly projecting rectangular tongue 26. Similarly the forward end portion of the bottom plate 18 is arcuately curved concentric with the axis of the pin 20 and includes a forwardly projecting rectangular tongue 28. The purpose of the tongues 26 and 28 is to assist the bolts 24 in limiting pivoting movement of the top plate 16 by contact of the respective tongue 26 and 28 with upstanding stops 30 positioned at respective sides of the bottom plate 18 and depending stops 32 positioned at respective sides of the upper plate 16. Thus, as shown in FIG. 4, rotative action of the upper plate 16, with respect to the bottom plate 18, is limited by the extent of the slots 22 and respective tongues 26—28 contacting their respective stops 30—32.

The forward end of the upper plate 16 forms the loop 33 of a hingelike leaf portion which is connected, in interdigitated relation, with the loops 34 of a hingelike member or leaf 35 by a hinge pin or bolt 36, extending coaxially through the loops 33 and 34, which permits vertical movement of the plate 16 about the horizontal axis of the hinge pin 36, as shown by dotted lines (FIG. 5). The hinge leaf 34 is connected to the towing vehicle hitch plate 12 by bolts 37 or by welding, if desired. The rearward end portion of the bottom plate 18 is centrally connected to one end of a mandrel 38. The rearward end portion of the mandrel 38 is diametrically reduced and is coaxially received by a sleeve 40 and maintained therein by a nut 42 threadedly connected with the rearward end portion of the mandrel 38. The sleeve 40 is rigidly secured, as by welding, indicated at 44, to a rectangular base 46. The base 46 is flatly connected to the beam 14 by bolts and nuts 48.

OPERATION

Operation of the device and its pivoting movement is illustrated by FIGS. 4, 5 and 6, wherein the turning radius of the towing vehicle 12 is limited by the slots 22, tongues 26—28 and stops 30—32. This limiting action also prevents jackknifing of the towed vehicle with respect to the towing vehicle. The hinge pin 36 permits vertical pivoting movement of the plates 16—18 and the sleeve 40, journaling the mandrel 38, permits tilting movement of the towed vehicle with respect to the horizontal plane of the plates 16 and 18. A lock pin, indicated by the dotted lines 50 (FIG. 3), is inserted through cooperating apertures formed in the bottom plate 18 and top plate tongue 26 to maintain the device 10 in aligned relation, as shown in FIGS. 1 to 3, for backing the connected vehicles in a straight path.

Obviously the invention is susceptible to changes or alterations without defeating its practicability, therefore, I do not wish to be confined to the preferred embodiment shown in the drawings and described herein.

I claim:

1. A device for connecting the forward end of a towed vehicle to the rearward end of a towing vehicle, comprising:

a pair of superposed plates, pivotally interconnected for limited horizontal movement about a vertical axis, extending between said vehicles;

hinge means connecting the forward end portion of the uppermost plate with said towing vehicle, the forward end portion of said uppermost plate forming one leaf of the hinge means;

sleeve and mandrel means connecting the rearward end portion of the lowermost plate with said towed vehicle;

a mandrel horizontally connected with and projecting rearwardly of the rearwardly disposed end portion of said lowermost plate;

a sleeve coaxially surrounding said mandrel; and, a baseplate longitudinally secured to a peripheral portion of said sleeve.